United States Patent
Sumi et al.

(10) Patent No.: US 11,401,192 B2
(45) Date of Patent: Aug. 2, 2022

(54) METHOD FOR PRODUCING HOLLOW POROUS QUARTZ GLASS BASE MATERIAL

(71) Applicants: Shin-Etsu Quartz Products Co., Ltd., Tokyo (JP); Heraeus Quarzglas GmbH & Co. KG, Hanau (DE)

(72) Inventors: Kotaro Sumi, Sasebo (JP); Hikari Kuwahara, Sasebo (JP)

(73) Assignees: Heraeus Deutschland GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 322 days.

(21) Appl. No.: 16/477,461

(22) PCT Filed: Dec. 28, 2017

(86) PCT No.: PCT/JP2017/047180
§ 371 (c)(1),
(2) Date: Sep. 25, 2019

(87) PCT Pub. No.: WO2018/131499
PCT Pub. Date: Jul. 19, 2018

(65) Prior Publication Data
US 2020/0270162 A1 Aug. 27, 2020

(30) Foreign Application Priority Data
Jan. 11, 2017 (JP) .............................. JP2017-002428

(51) Int. Cl.
*C03B 19/14* (2006.01)
*C03C 3/06* (2006.01)
*C03B 37/014* (2006.01)

(52) U.S. Cl.
CPC .... *C03B 19/1492* (2013.01); *C03B 37/01493* (2013.01); *C03C 3/06* (2013.01); *C03B 2201/02* (2013.01)

(58) Field of Classification Search
CPC ................................................ C03B 37/01493
See application file for complete search history.

(56) References Cited

U.S. PATENT DOCUMENTS

| 8,783,069 B2 | 7/2014 | Schuster et al. |
| 9,284,213 B2 | 3/2016 | Mundy et al. |
| (Continued) | | |

FOREIGN PATENT DOCUMENTS

| JP | 62-078124 | 7/1984 |
| JP | 61-101429 | 5/1986 |
| (Continued) | | |

OTHER PUBLICATIONS

International Search Report and Written Opinion dated Apr. 3, 2018 in parallel application PCT/JP2017/047180.

*Primary Examiner* — Queenie S Dehghan
(74) *Attorney, Agent, or Firm* — Dicke, Billig & Czaja, PLLC

(57) ABSTRACT

One aspect is a method for producing a hollow porous quartz glass base material. Even when the hollow porous quartz glass base material is produced in large weight and high bulk density, the ease of target extraction is maintained and target extraction is performed stably. The method includes preparing a heat resistant substrate, which has an outer surface on which $SiO_2$ particles are deposited, the outer surface having a surface roughness in which the maximum height Rz is less than 9 μm and the arithmetic average roughness Ra is less than 1 μm. The heat resistant substrate is rotated and $SiO_2$ particles are deposited on the outer surface of the heat resistant substrate to form a glass particulate deposit. The heat resistant substrate is extracted from the glass particulate deposit to produce the base material.

3 Claims, 3 Drawing Sheets

(56) References Cited

U.S. PATENT DOCUMENTS

| | | | |
|---|---|---|---|
| 2004/0190846 A1* | 9/2004 | Nakamura | C03B 37/01433 385/123 |
| 2005/0097923 A1* | 5/2005 | Pender | C03B 37/01486 65/427 |
| 2007/0214834 A1 | 9/2007 | Roeper et al. | |
| 2014/0106094 A1* | 4/2014 | Mundy | C03B 19/1492 428/34.4 |

FOREIGN PATENT DOCUMENTS

| | | |
|---|---|---|
| JP | 2001-172025 | 6/2001 |
| JP | 2003-073139 | 3/2003 |
| JP | 2013-23411 | 2/2013 |

\* cited by examiner

METHOD FOR PRODUCING HOLLOW POROUS QUARTZ GLASS BASE MATERIAL

CROSS REFERENCE TO RELATED APPLICATION

This Utility Patent Application claims priority under 35 U.S.C. § 371 to International Application Serial No. PCT/JP2017/047180, filed Dec. 28, 2017, which claims the benefit of Japanese Patent Application No. JP 20170002428, filed Jan. 11, 2017; which are both incorporated herein by reference.

FIELD OF THE INVENTION

This invention is related to a method for manufacturing hollow porous quartz glass preform and a method for manufacturing synthetic quartz glass cylinders.

BACKGROUND OF THE INVENTION

Synthetic quartz glass is widely used in optics, semiconductors, and the chemical industry. Specifically, it is used as lens material for microlitography projections and exposure systems and as material for semiconductor manufacturing tools and optical fibres.

Hollow synthetic quartz glass cylinder manufacturing typically involves manufacturing hollow porous glass quartz preform (soot) and making it transparent by sintering. The OVD (outside vapour deposition) method is a known method in soot manufacturing whereby soot is manufactured by deposits of fine $SiO_2$ particles using flame hydrolysis or heat decomposition of raw materials containing silicon on target outer surface rotated centrally around a major axis.

Hollow porous glass quartz preform (soot) requires extracting the target prior to sintering and extraction work involves relative rotation of the target and hollow soot and moving it along the major axis. If the soot and target are fixed, this work becomes extremely difficult. Furthermore, even if extraction is possible by applying much force, the inner surface of the soot is damaged when doing so, and the damage remains in the form of local defects in quartz cylinder after sintering and this ends up creating defective parts.

For hollow quartz cylinders, the inner diameter is formed by passing cylinders or cylindrical shafts of ceramic, quartz glass, carbon, or similar through the hollow part of the soot and then sintering in that state. When sintering is done after passing the shaft through, the soot adheres to that shaft, so an inner form that follows the form of the shaft can be obtained. Hollow quartz cylinders thusly created are subjected to various types of machining depending on their application and processed into their target forms.

In recent years, the increase in the diameter of semiconductor wafers and increase in the size of optical fibre preform has raised the demand for an increase in the diameter of quartz cylinders and raised the demand for heavyweight quartz cylinders. Manufacturing heavyweight quartz cylinders demands the heavyweight formation of hollow porous quartz glass preform (soot), which is a manufacturing intermediate. Increasing packing density is a cost-effective method for the heavyweight formation of hollow porous quartz glass preform. Heavyweight formation with low density makes for large volumes, so soot manufacturing equipment and equipment for making soot transparent by sintering also has to be large, which demands large capital investment.

On the other hand, densification of soot increases cohesion between the soot inner surface and target, making target extraction work difficult, which is a problem. In order to facilitate the extraction of the target from the soot, patent literature 1 describes a method for facilitating extraction by extracting in the direction of the greatest outer diameter by making the target form conical. Also, patent literature 2 describes a method for making this work easy by setting $SiO_2$ soot mean density at 0.3~0.5 $g/cm^3$ and having initial conditions for gas at least 15% lower than steady conditions for $H_2$ volume and having source gas conditions at least 30% of steady conditions. Nevertheless, if mean packing density is low in this method, a big change in the facilities will be required, which is undesirable.

Patent literature also describes a method for making extraction easier and obtaining a smooth soot inner surface by depositing the first layer of at most 0.2 $g/cm^3$ packing density in the juncture between the target material, and then removing the first layer after extraction by creating the second layer with density of at least 0.03 $g/cm^3$ higher than the first layer on top of the deposited first layer. Nevertheless, a low-density layer of 0.2 $g/cm^3$ or lower will be formed for the first layer, but if it becomes heavyweight due to deposition while rotating the target in the direction of the major axis, the centrifugal force applied to the soot and the increased shear force at the boundary of the target and soot will collapse the first layer (low density layer of 0.2 $g/cm^3$ or lower) during growth of deposits and problems will arise, such as the soot moving in the direction of the major axis on top of the target and soot not following the rotation of the target. This creates concerns over manufacturing becoming impossible.

Furthermore, regarding the sampling of the target from the large-diameter soot, the method described in patent literature 4 is a method for manufacturing hollow porous quartz glass preform that makes it possible to obtain a homogeneous internal diameter by sufficient contact with the shaft during sintering, and it makes it easy to remove the target without damaging the interior, despite heavyweight formation with high density by ensuring that the deposition process entails a first layer formation process in which packing density is 0.45 $g/cm^3$ or higher and a first layer of 0.8 $g/cm^3$ or lower is formed, and a second layer formation process in which, adjoining said first layer exterior, packing density is 0.55 $g/cm^3$ or higher and a second layer having minimum packing density that is at least 0.1 $g/cm^3$ higher than the first layer minimum packing density is formed, and a third layer formation process in which, adjoining said second layer exterior, packing density is 0.44 $g/cm^3$ or higher and 0.88 $g/cm^3$ or lower and a third layer having maximum packing density that does not exceed the maximum packing density of the second layer is formed.

In most cases, issues are resolved by the method described in patent literature 4. Nevertheless, it has become clear that under certain conditions during manufacturing, removing the target can be difficult despite the use of the method described in patent literature 4.

PRIOR ART LITERATURE

Patent Literature

[Patent literature 1] Kokai H8-208242 Patent Journal
[Patent literature 2] Kokai 2004-18364 Patent Journal
[Patent literature 3] Kokai S61-205632 Patent Journal
[Patent literature 4] Kokai 2016-3162 Patent Journal

SUMMARY OF THE INVENTION

Problems to be Solved by the Invention

In view of the said problems with prior art, this invention is intended to provide a manufacturing method for synthetic quartz glass cylinders and manufacturing method for hollow porous quartz glass preform that allows for the manufacturing of heavyweight soot, performing stable removal of the target, and maintaining ease of removal of the target despite increasing packing density and heavyweight formation of the hollow porous quartz glass preform (soot).

Means for Solving the Problem

In order to solve said problems, the manufacturing method for hollow porous quartz glass preform in this invention is characterised by the fact that it includes a process of preparing a columnar or cylindrical heat-resistant substrate with surface roughness of the outer surface on which $SiO_2$ particles are deposited with maximum height Rz below 9 μm and arithmetic mean roughness Ra below 1 μm and a process of forming fine glass particle deposits by rotating said heat-resistant substrate and making $SiO_2$ particles deposit on the outer surface of said heat-resistant substrate and a process for manufacturing hollow porous quartz glass preform by removing said heat-resistant substrate from said fine glass particle deposits. In this invention, said heat-resistant substrate is also referred to as the target. In this invention, said surface roughness Ra and Rz are calculated based on JIS B 0601:2001.

It is desirable that said heat-resistant substrate Rz is 6.0 μm or lower and Ra is 0.6 μm or lower and even more desirable that Rz is 4.0 μm or lower and Ra is 0.4 μm or lower and even more desirable that Rz is 2.0 μm or lower and Ra is 0.2 μm or lower.

The heat-resistant substrate in this invention is the heat-resistant substrate used in the manufacturing method for hollow porous quartz glass preform in this invention and characterised by the fact that the surface roughness of the exterior surface on which $SiO_2$ particles are deposited has maximum height Rz below 9 μm and arithmetic mean roughness Ra below 1 μm.

The manufacturing method for synthetic quartz glass cylinders in this invention is characterised by the fact that hollow porous quartz glass preform obtained by the manufacturing method for hollow porous quartz glass preform in this invention is used.

The hollow porous quartz glass preform in this invention is hollow porous quartz glass preform obtained by the manufacturing method for hollow porous quartz glass preform in this invention.

The synthetic quartz glass cylinders in this invention are synthetic quartz glass cylinders obtained by the manufacturing method for synthetic quartz glass cylinders in this invention.

Effects of the Invention

This invention will have a great effect in providing a manufacturing method for synthetic quartz glass cylinders and a manufacturing method for hollow porous quartz glass preform that allows heavyweight soot to be manufactured and target to be removed in a stable manner while maintaining ease of removal of the target despite heavyweight formation and increased packing density of hollow porous quartz glass preform (soot). Furthermore, this invention has the effect of easing the cleaning work required to remove the fine silica particles that adhere to the target removed from the soot and at the same time ensures the ease of removal of the target without variation between lots.

DESCRIPTION OF THE INVENTION

Figure 1:
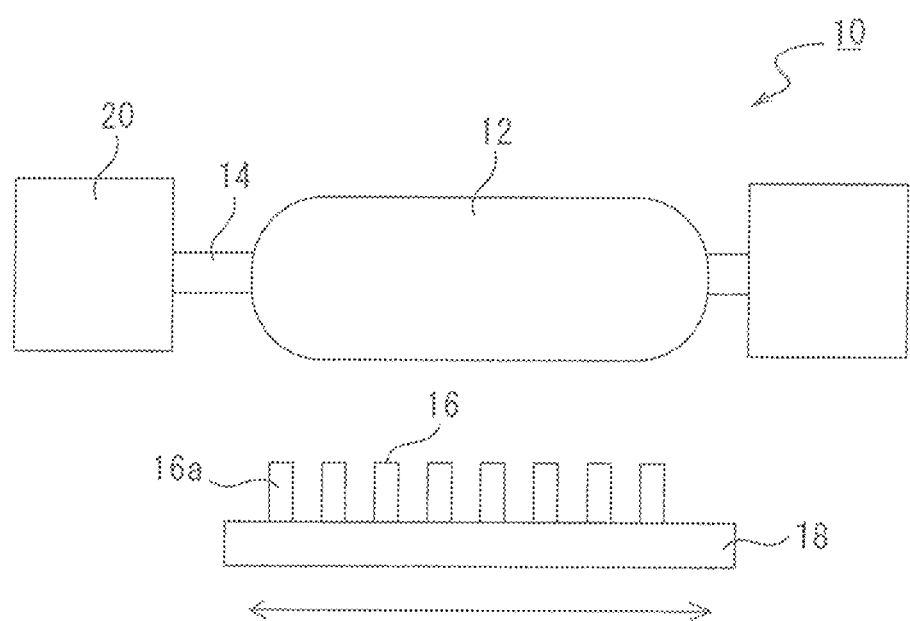
FIG. 1 This is an outline explanatory figure showing one embodiment of the manufacturing method for hollow porous quartz glass preform in this invention.

Below is an explanation of the form of the embodiments of this invention, but note that the form of these embodiments is described by way of example, and it goes without saying that a variety of modifications are possible, so long as they do not deviate from the idea of the art in this invention. In the figures, the same materials are expressed with the same codes.

Upon detailed observation of soot and targets removed from soot from lots in which removing the target was difficult and soot and targets removed from soot from lots in which removing the target was easy in the manufacture of high-density heavyweight soot by the OVD method, the inventors discovered that, in terms of the amount of fine silica particles adhering to the target, there was more adhesion in lots in which removing the target was difficult. Despite visual observation after removal of the adhered fine silica particles, no large difference was observed.

Then, a surface roughness tester (small surface roughness measuring device: Surftest SJ-210, Mitutoyo Corporation) was used to measure the surface roughness of the target and it became clear that the more difficult it was to remove the target, the greater was the surface roughness. In other words, even if the target surface was smooth at a glance, the slight difference in surface roughness led to a difference in the ease of removal of the target. If surface roughness value is high, fine silica particles are trapped in the irregularities of the surface when the target is extracted from the soot and other fine silica particles further adhere to these trapped fine silica particles and this is repeated, which leads to a state in which powder is clogging the clearance on the outer surface of the target and inner surface of the soot, making removability poor.

By stipulating both arithmetic mean roughness Ra and maximum height Rz (JIS B 0601:2001) for surface roughness of the surface of the target, smoothness and catching are controlled, making it possible to make stable the ease of target removability.

Namely, the manufacturing method for hollow porous quartz glass preform in this invention is a manufacturing method for hollow porous quartz glass preform whereby a columnar or cylindrical heat-resistant substrate is rotated and $SiO_2$ particles are deposited on the external surface of said heat-resistant substrate and fine glass particle deposits are obtained, after which said heat-resistant substrate is extracted from said fine glass particles and hollow porous quartz glass preform is manufactured, and a target material with surface roughness of the exterior on which $SiO_2$ particles are deposited is Rz below 9 μm and Ra below 1 μm is used. Said surface roughness conditions apply to at least the target surface that touches the fine glass particle deposits (that is, the external surface of the part on which $SiO_2$ particles are deposited) and it is even more optimal that the entire circumference surface of the target material meet said surface roughness conditions.

If the surface roughness of the exterior surface of the heat-resistant substrate on which $SiO_2$ particles are deposited has Rz of 9 μm or higher, there arises the tendency for the particles to adhere to soot interior surface due to irregularities of the exterior surface of said heat-resistant substrate, and if Ra is 1 μm or higher, part of the soot interior surface breaks down and the resulting soot powder adheres to the surface of the target and other soot powder further adheres to said adhered soot powder, which causes the problem of soot powder becoming caught between the surface of the target and soot interior surface.

In the method in this invention, using target material with Rz below 9 μm and Ra below 1 μm makes it possible to stabilise the ease of target removability.

The method for preparing heat-resistant substrate that meets said surface roughness conditions is not limited in any particular way, but surface roughness checks are done prior to use, and if conditions are not met, it is desirable to obtain a heat-resistant substrate meeting said surface roughness conditions by homogenizing at least the exterior surface of the target connected to the fine glass particle deposits by polishing or other means. There are no particular restrictions on the homogenization method, but it is optimal to do this through mechanical polishing using a diamond-coated abrasive or similar.

The heat-resistant substrate used as the target could develop a coarse surface roughness due to thermal degeneration or oxidative consumption of target material during manufacture of the hollow porous quartz glass preform, so when hollow porous quartz glass preform is being manufactured in succession, it is desirable to confirm the surface roughness of the target material prior to use and to polish the target material each time surface roughness becomes coarse in order to ensure that said surface roughness conditions are met.

It is desirable that said heat-resistant substrate Rz is 6.0 μm or lower and Ra is 0.6 μm or lower and even more desirable that Rz is 4.0 μm or lower and Ra is 0.4 μm or lower and even more desirable that Rz is 2.0 μm or lower and Ra is 0.2 μm or lower.

There are no particular restrictions on said heat-resistant substrate material if it is heat resistant, but $Al_2O_3$, SiC, $Si_3N_4$ and other ceramics and carbon and metal materials or similar are optimal.

Figure 2:
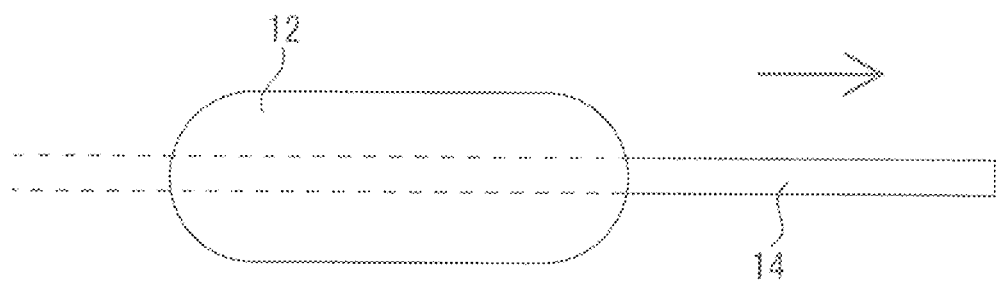
FIG. 2 This is an outline explanatory figure showing the sampling of target from glass particle deposits.

FIG. 1 is an outline explanatory figure showing one embodiment of the manufacturing method of the hollow porous quartz glass preform in this invention and FIG. 2 is an outline explanatory figure showing the removal of the target from the fine glass particle deposits. In FIG. 1, code 10 is manufacturing equipment for the manufacture of hollow porous quartz glass preform and includes target holding and rotation mechanism 20 to control the rate of rotation and maintain the rotation of target 14, burner group 16 for synthesis of glass particles with burners 16a arranged at specific intervals for the synthesis of multiple glass particles, burner group movement controller 18 to control the up and down movement and to and from movement (swing) of said burner group 16. For said target 14, surface roughness of the exterior surface on which fine glass particles are deposited has Rz below 9 μm and Ra below 1 μm. In FIG. 1, a target material that satisfies above conditions for surface roughness of all circumference surfaces is used for target 14. Also, although a columnar (rod) target material was used for target 14, a cylindrical target material may be used.

As shown in FIG. 1, the $SiO_2$ particles generated by the hydrolysis reaction caused by the flame of burner 16a for the synthesis of fine glass particles supplied with glass material ($SiCl_4$) are deposited on exterior surface meeting said surface roughness conditions for target 14, whose rotation centred on the major axis is maintained through target holding and rotation mechanism 20, forming fine glass particle deposit 12. After that, as shown in FIG. 2, target 14 is sampled from said fine glass particle deposit 12, and it is possible to manufacture the hollow porous quartz glass preform of this invention. Note that FIG. 1 shows an embodiment of the deposits of $SiO_2$ particles through the hydrolysis reaction by the flame of burner 16a for the synthesis of fine glass particles supplied with glass raw material ($SiCl_4$), but fine glass particle deposits may also be formed by depositing fine $SiO_2$ particles on the target through heat decomposition.

By using a target having said surface roughness conditions, the ease of removal of the target is maintained, target removal can be done stably, and heavyweight soot can be manufactured even in the manufacture of heavyweight and high packing density hollow porous quartz glass preform, in which target removal has been traditionally difficult. By the method in this invention, it is possible to easily obtain 150 to 350 kg heavyweight hollow porous quartz glass preform and mean packing density of 0.5-0.8 g/cm³ high packing density hollow porous quartz glass preform.

This hollow porous quartz glass preform would optimally be heavyweight hollow porous quartz glass preform, with 150 to 350 kg being desirable and 200 to 300 kg being even more desirable. Also, this hollow porous quartz glass preform would optimally be high packing density hollow porous quartz glass preform, with mean packing density of 0.5-0.8 g/cm³ being desirable and 0.6-0.7 g/cm³ being even more desirable.

Furthermore, this invention has an effect of making easy the cleaning work to remove the fine silica particles that adhere to the target removed from the fine glass particle deposits while enabling to keep the ease of removal of the target without variation between lots.

The manufacturing method of synthetic quartz glass cylinders in this invention uses hollow porous quartz glass preform obtained through the method of this invention. For the manufacturing method of this synthetic quartz glass cylinder, the hollow porous quartz glass preform is used and made into glass by known methods, and though there are no particular restrictions for the manufacture of synthetic quartz glass cylinders, it is optimal to have dehydration treatment and making transparent by sintering to obtain synthetic quartz glass cylinders.

EMBODIMENTS

Embodiments are provided below to more concretely describe this invention, but these embodiments are described by way of example and it goes without saying that they should not be interpreted restrictively.

Embodiment 1

Using the manufacturing equipment for hollow porous quartz glass preform shown in FIG. 1, 12 units of hollow porous quartz glass preform were created by the OVD method. A SiC-made cylinder finished to maximum surface roughness Rz≤6.0 μm and Ra≤0.6 μm around the entire circumference by polishing with #240 diamond coated abrasive mounted to a belt sander was used for the target and experiments were conducted on 12 units consecutively. Measurements of target surface roughness were done based on JIS B 0601:2001 using surface roughness tester (small surface roughness measuring device: Surftest SJ-210, Mitutoyo Corporation). If surface roughness became coarse due to thermal degeneration or oxidative consumption of target material during the consecutive creation of 12 units of hollow porous quartz glass preforms, the target material was polished each time in order to ensure that said surface roughness was achieved.

By introducing oxygen gas and hydrogen gas and setting up multiple burners for incineration on the vertical motion device and burner swing so that they are arranged perpendicularly to the axial direction of the target, swinging these multiple burners parallel to the axial direction of the target and, while rotating the target held by the target holding and rotation mechanism, depositing fine silica particles on the exterior circumference of the target and creating fine glass particle deposits, fine glass particle deposits with an external diameter of 400 mm were obtained. The manufacturing conditions at this time were silicon tetrachloride 1020 g/min, burner and target or soot distance: 300 mm, swing rate: 300 mm/min.

Figure 3:
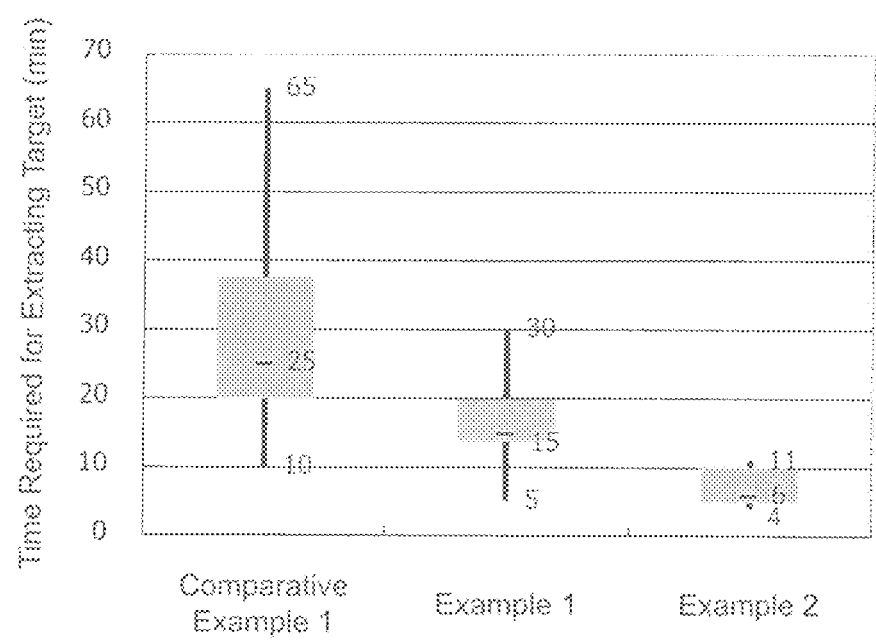
FIG. 3 This is a graph showing the results of embodiment 1, 2 and comparison 1.

Target was sampled from the obtained fine glass particle deposits and hollow porous quartz glass preform (soot) was obtained. FIG. 3 shows the time needed to remove the target. As shown in FIG. 3, target removability was good for all cases and variability in the time required for the removal work has also decreased.

Also, the density of the obtained soot differed by soot site, but maximum density was approximately 0.8 g/cm$^3$ and minimum density was approximately 0.5 g/cm$^3$ for soot. Density was calculated based on volume calculated from measured weight and soot external diameter and length.

Obtained soot was made transparent by sintering upon setting up the shaft to the opening of the soot. Obtained soot had no defects or similar on the inner surface because target removal was easy. By making this soot transparent by sintering, it was possible to obtain synthetic quartz glass cylinders that did not have local defects on the inner surface and had an even inner diameter that adhered to the shaft.

Embodiment 2

Other than the change to the target material, the work was performed under the same conditions as for embodiment 1 and 12 units of hollow porous quartz glass preform (soot) were obtained. The target was polished with a #800 diamond coated abrasive mounted to a belt sander and a SiC-made cylinder finished to maximum surface roughness Rz≤2.0 μm and Ra≤0.2 μm was used and experiments were conducted on 12 units consecutively. Also, if surface roughness became coarse due to thermal degeneration or oxidative consumption of target material during the consecutive creation of 12 units, the target material was polished each time in order to ensure that said surface roughness was achieved.

FIG. 3 shows the time needed to remove the target. As shown in FIG. 3, ease of target removability was greater than for embodiment 1 and maximum value was also reduced, as was variability.

(Comparison 1)

Other than the changes to the target material, the work was performed under the same conditions as for embodiment 1 and 12 units of hollow porous quartz glass preform (soot) were obtained. The target used had a maximum value for surface roughness of the circumference surface of Rz=9.8 μm and Ra=1.8 μm. FIG. 3 shows the time needed to remove the target. There were some cases in which target was easily removable, but it was difficult in many cases, and the time required for this removal was highly variable. The most difficult lot took 65 minutes.

EXPLANATION OF CODES

10: Manufacturing equipment, 12: Fine glass particle deposits, 14: Target, 16: Burner group for the synthesis of fine glass particles, 16a: Burner for the synthesis of fine glass particles, 18: Swing and vertical motion device for burner group for the synthesis of fine glass particles, 20: Target holding and rotating device.

[Document Name] Summary

What is provided is a manufacturing method for synthetic quartz glass cylinders and a manufacturing method for hollow porous quartz glass preform that allows heavyweight soot to be manufactured and target to be removed in a stable manner while maintaining ease of removal of the target despite the heavyweight formation and increasing packing density of hollow porous quartz glass preform (soot).

A process of preparing a columnar or cylindrical heat-resistant substrate with surface roughness of the outer surface on which SiO$_2$ particles are deposited with maximum height Rz below 9 μm and arithmetic mean roughness Ra below 1 μm and a process of forming glass particle deposits by rotating said heat-resistant substrate and making SiO$_2$ particles deposit on the outer surface of said heat-resistant substrate and a process for manufacturing hollow porous quartz glass preform by removing heat-resistant substrate from said glass particle deposits are included.

The invention claimed is:

1. A manufacturing method for hollow porous quartz glass preform comprising:
    preparing a columnar or cylindrical heat-resistant substrate with surface roughness of the outer surface on which SiO$_2$ particles are deposited with maximum height of less than 9 μm and arithmetic mean roughness of less than 1 μm;
    forming fine glass particle deposits by rotating said heat-resistant substrate and making SiO$_2$ particles deposit on the outer surface of said heat-resistant substrate; and
    manufacturing hollow porous quartz glass preform by removing said heat-resistant substrate from said glass particle deposits.

2. The manufacturing method for porous quartz glass preform of claim 1, wherein the heat-resistant substrate maximum height is 6.0 μm or lower and arithmetic mean roughness is 0.6 μm or lower.

3. A heat-resistant substrate used in the method of claim 1, wherein the surface roughness of the exterior surface on which SiO$_2$ particles are deposited has maximum height below 9 μm and arithmetic mean roughness below 1 μm.

* * * * *

UNITED STATES PATENT AND TRADEMARK OFFICE
CERTIFICATE OF CORRECTION

PATENT NO. : 11,401,192 B2
APPLICATION NO. : 16/477461
DATED : August 2, 2022
INVENTOR(S) : Sumi et al.

It is certified that error appears in the above-identified patent and that said Letters Patent is hereby corrected as shown below:

On the Title Page

Item (73), Assignees: delete "Heraeus Deutschland GmbH & Co. KG, Hanau (DE); Shin-Etsu Quartz Products Co., Ltd., Tokyo (JP)" and insert in place thereof --Heraeus Quarzglas GmbH & Co. KG, Hanau (DE); Shin-Etsu Quartz Products Co., Ltd., Tokyo (JP)--.

Signed and Sealed this
Second Day of January, 2024

Katherine Kelly Vidal
*Director of the United States Patent and Trademark Office*